(12) United States Patent
Funakubo

(10) Patent No.: US 12,485,496 B2
(45) Date of Patent: Dec. 2, 2025

(54) DEVICE FOR CONTROLLING WIRE ELECTRICAL DISCHARGE MACHINING APPARATUS

(71) Applicant: FANUC CORPORATION, Yamanashi (JP)

(72) Inventor: Ryuuki Funakubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 761 days.

(21) Appl. No.: 17/759,699

(22) PCT Filed: Feb. 2, 2021

(86) PCT No.: PCT/JP2021/003744
§ 371 (c)(1),
(2) Date: Jul. 28, 2022

(87) PCT Pub. No.: WO2021/157575
PCT Pub. Date: Aug. 12, 2021

(65) Prior Publication Data
US 2023/0076571 A1  Mar. 9, 2023

(30) Foreign Application Priority Data
Feb. 5, 2020 (JP) ................. 2020-017844

(51) Int. Cl.
*B23H 7/06* (2006.01)
*G05B 13/02* (2006.01)
(52) U.S. Cl.
CPC ........... *B23H 7/06* (2013.01); *G05B 13/0265* (2013.01)
(58) Field of Classification Search
CPC ....... B23H 7/06; G05B 13/0265; G06N 20/00
See application file for complete search history.

(56) References Cited

U.S. PATENT DOCUMENTS

2016/0236292 A1\* 8/2016 Onodera ............... B23H 1/022
2017/0060105 A1   3/2017 Onodera et al.
(Continued)

FOREIGN PATENT DOCUMENTS

CN        109420809 A     3/2019
DE   10 2020 131 801 A1   6/2021
(Continued)

OTHER PUBLICATIONS

International Search Report issued in PCT/JP2021/003744; mailed Apr. 13, 2021.

*Primary Examiner* — Robert G Bachner
(74) *Attorney, Agent, or Firm* — Studebaker Brackett PLLC

(57) ABSTRACT

Provided is a device for controlling a wire electrical discharge machining apparatus, the device making it possible to improve machining precision even in machining in which a plurality of corner control segments overlap. A device for controlling a wire electrical discharge machining apparatus, the device comprising: a storage unit that stores a machining program and a prescribed plurality of corner control patterns that can be applied to each corner part; a control unit that performs corner control for switching between prescribed machining conditions on the basis of a corner shape during machining of a corner part; a calculation unit that calculates a corner control segment from the start point and the end point of the corner control; and a selection unit that, when the corner control segments calculated by the calculation unit overlap, selects one corner control pattern to perform in a prioritized manner from the storage unit.

2 Claims, 8 Drawing Sheets

(56) References Cited

U.S. PATENT DOCUMENTS

2018/0281091 A1 10/2018 Nakashima
2019/0179337 A1* 6/2019 Ji ........................... G06N 20/00

FOREIGN PATENT DOCUMENTS

| | | |
|---|---|---|
| JP | S55-024806 A | 2/1980 |
| JP | H01-228727 A | 9/1989 |
| JP | H08-099226 A | 4/1996 |
| JP | H08-168925 A | 7/1996 |
| JP | 2019-093451 A | 6/2019 |
| TW | 201311383 A | 3/2013 |
| TW | 201923611 A | 6/2019 |
| WO | 2000/032342 A1 | 6/2000 |
| WO | 2015/063932 A1 | 5/2015 |

* cited by examiner

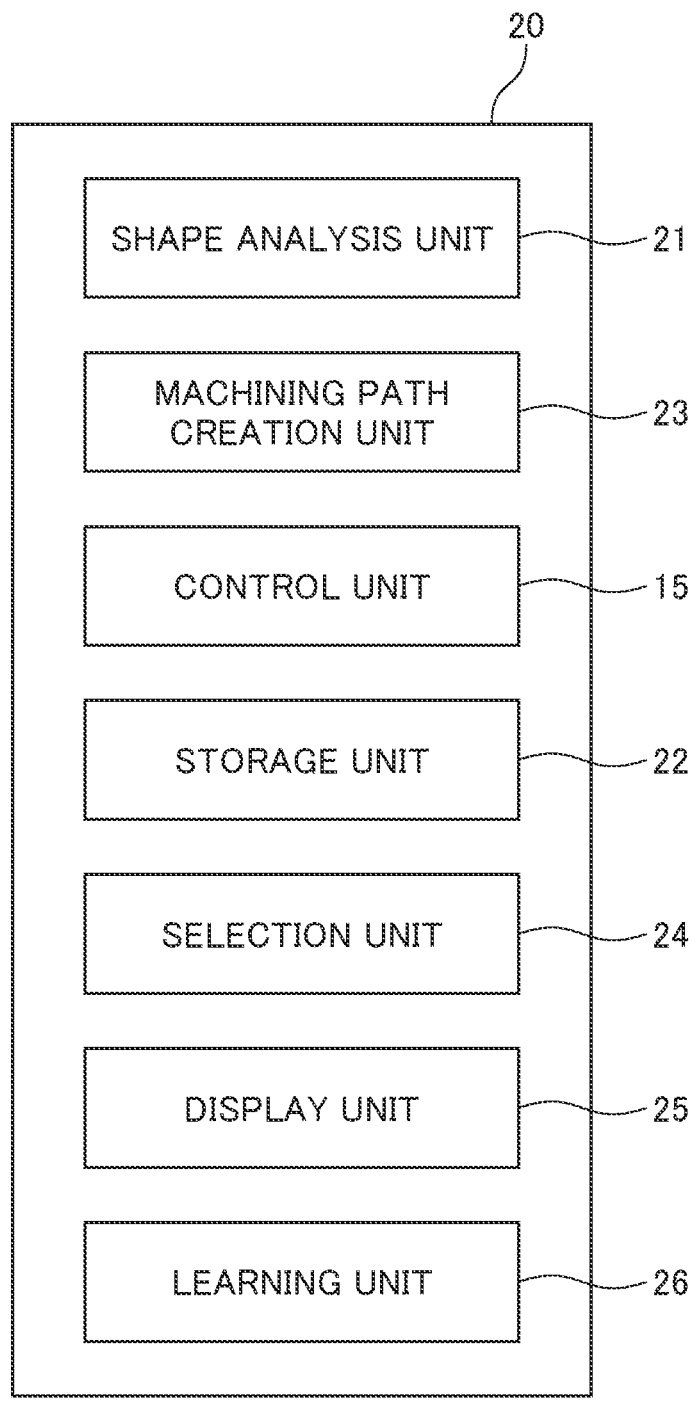

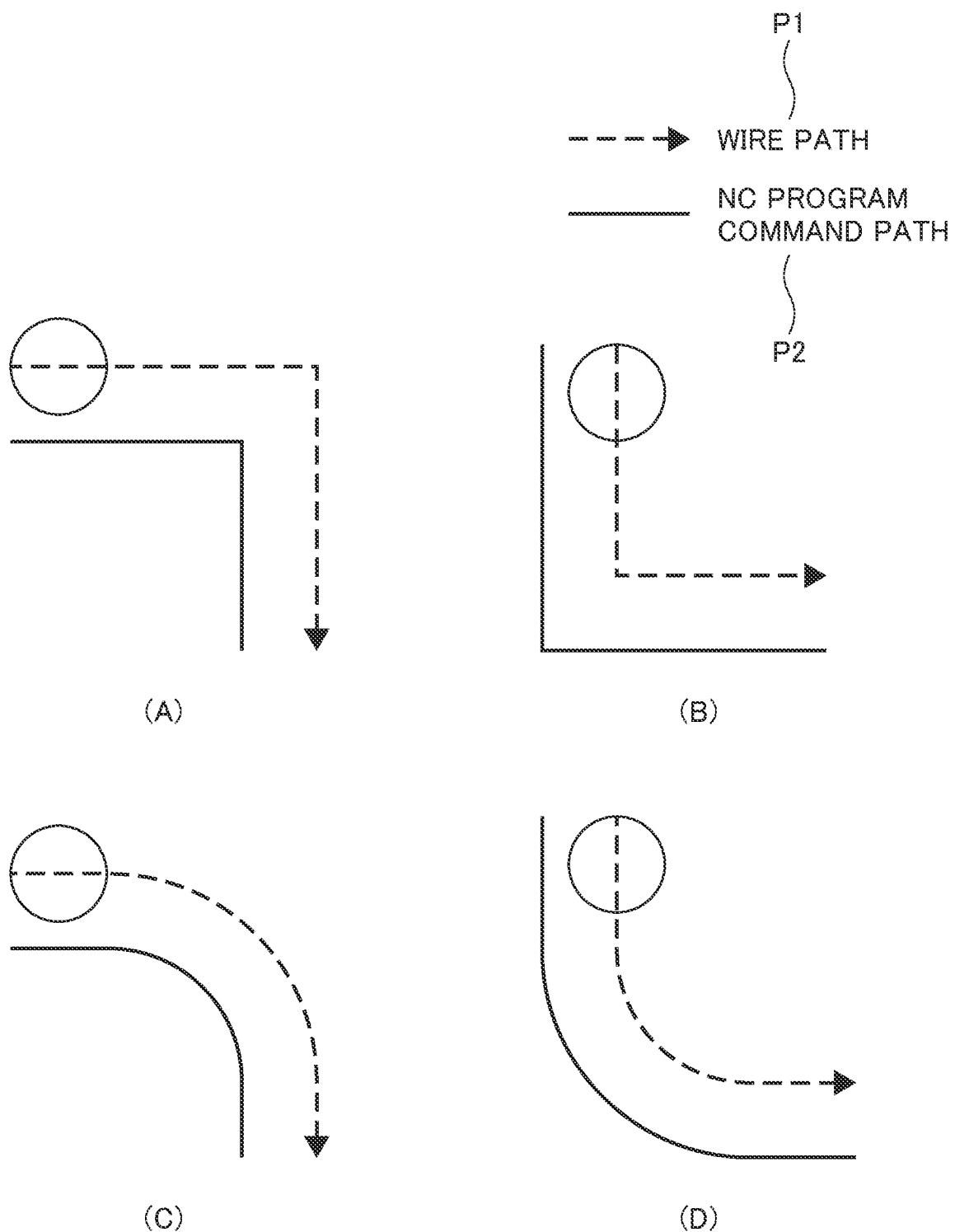

DEVICE FOR CONTROLLING WIRE ELECTRICAL DISCHARGE MACHINING APPARATUS

TECHNICAL FIELD

The present invention relates to a controller for controlling a wire electrical discharge machining apparatus.

BACKGROUND ART

A controller for controlling a wire electrical discharge machining apparatus executes machining by combining corner shapes of a machining process (corner shapes of an NC program) as illustrated in FIG. 8.

FIG. 8 illustrates diagrams for describing examples of corner shapes of the NC program. The examples indicate a plurality of examples such as an outer sharp edge corner ((A) in FIG. 8) and an inner sharp edge corner ((B) in FIG. 8) formed by two continuous cutting feed blocks, as well as an outer arc corner where a wire path is on the outer side of a circle of an arc block ((C) in FIG. 8) and an inner arc corner where a wire path is on the inner side of a circle of an arc block ((D) in FIG. 8), and the like.

Since how the machining state changes vary depending on those corner shapes, the controller for controlling the wire electrical machine performs corner control corresponding to the corner shapes by performing switching between different machining conditions (machining speeds, electrical discharge power intensities, and the like).

In a case of a shape including a plurality of continuous corner control segments illustrated in FIG. 8 (hereinafter, referred to as continuous corners), the machining conditions are switched abruptly and the machining state changes significantly. Therefore, it may not be possible to achieve desired machining accuracy in some cases.

Thus, in the field of controllers for controlling an electrical discharge machining apparatus, the machining accuracy is increased by employing, for example, a method that detects in advance overlapping of the corner control segments, and performs control by using a value resulting from interpolation of a change amount of the machining conditions of the corner control in the segments, or a method that determines in advance the corner control to be performed preferentially.

Patent Document 1: Japanese Unexamined Patent Application, Publication No. H08-168925

DISCLOSURE OF THE INVENTION

Problems to be Solved by the Invention

However, there has been a problem in that a sufficient machining accuracy cannot be achieved with the control by the same interpolation method or the same priority order determination method for various combination patterns of the continuous corners described above.

Therefore, in the field of the controllers for controlling the electrical discharge machining apparatus, it is desirable to be able to improve the machining accuracy even in a case of performing machining on a plurality of overlapping corner control segments.

Means for Solving the Problems

A controller for controlling a wire electrical discharge machining apparatus including a machining unit that performs discharge machining on a workpiece by executing a machining program according to the present disclosure includes: a storage unit that stores the machining program and a plurality of corner control patterns each of which is applicable to a respective one of corner parts; a control unit that performs corner control for switching to a prescribed machining condition based on a corner shape when machining is to be performed on the corner part; a calculation unit that calculates corner control segments from a start point and an end point of the corner control; and a selection unit that selects, from the storage unit, one of the corner control patterns to be preferentially performed in a case where the corner control segments calculated by the calculation unit overlap.

Effects of the Invention

According to an aspect of the present disclosure, it is Possible to improve the machining accuracy for continuous corner even in a case where a plurality of corner control segments overlap.

BRIEF DESCRIPTION OF THE DRAWINGS

FIG. 7 is a block diagram for describing a controller for controlling a wire electrical discharge machining apparatus according to a third embodiment; and FIG. 8 illustrates diagrams for describing examples of corner shapes of an NC program.

PREFERRED MODE FOR CARRYING OUT THE INVENTION

Embodiments will be described in detail with reference to the accompanying drawings. First, by referring to FIG. 1, a configuration of a wire electrical discharge machining apparatus 1 will be described.

Figure 1:
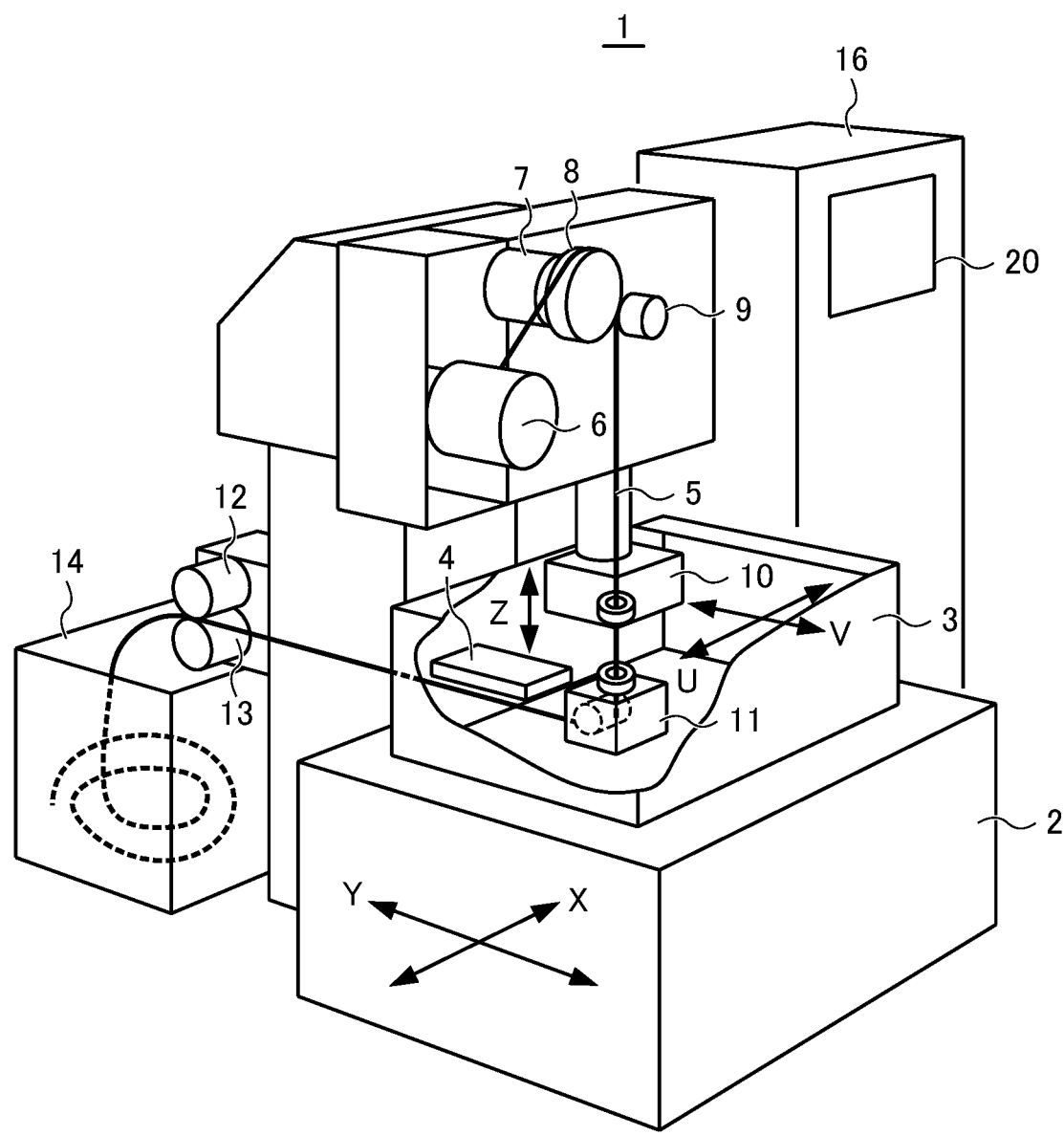
FIG. 1 is a perspective view illustrating an overview of a wire electrical discharge machining apparatus according to an embodiment.

FIG. 1 is a schematic perspective view illustrating the wire electrical discharge machining apparatus 1 according to the present embodiment. The wire electrical discharge machining apparatus 1 illustrated in FIG. 1 performs electrical discharge machining on a workpiece W, (machining target) while relatively moving a wire electrode and the workpiece W according to a machining program. The wire electrical discharge machining apparatus 1 repeatedly performs, on the workpiece W, a plurality of electrical discharge machining steps from roughing to finishing.

In each of the machining steps, the wire electrical discharge machining apparatus 1 creates a machining path (referred to as a wire diameter compensated path) that is offset, by an offset value (including a wire diameter compensation value), from a program shape (machining shape)

of the workpiece according to the machining program. The offset values for the machining steps are different from each other. In each of the machining steps, the wire electrical discharge machining apparatus 1 relatively moves the wire electrode and the workpiece W according to the machining path.

The wire electrical discharge machining apparatus 1 includes a bed 2, a work-pan 3, a workpiece table 4, a wire electrode 5, a wire bobbin 6, a motor/powder brake 7, a brake roller 8, a pinch roller 9, an upper guide 10, a lower guide 11, a pinch roller 12, a feed roller 13, a wire collection box 14, a control unit 15, a machining power supply 16, and a controller 20 for controlling the wire electrical discharge machining apparatus 1 according to the embodiment.

Note here that the controller 20 is constituted by an operation processor such as a Digital Signal Processor (DSP), a Field-Programmable Gate Array (FPGA), or the like. Various functions of the controller 20 are achieved by executing software (program, application). The controller 20 controls the wire electrical discharge machining apparatus 1 that performs wire electrical discharge machining on the workpiece N by moving the wire electrode 5 loaded to the apparatus 1.

The controller 20 includes a rewritable storage unit 22 to store a program for analyzing the machining program, determination conditions the program refers to, and parameters (including offset values).

The bed 2 is a machine bed where the work-pan 3 is placed. The work-pan. 3 is a space which is filled with a dielectric working fluid and in which electrical discharge machining is performed. The workpiece table 4 is a table where the workpiece W is loaded, and a relative position with respect to the wire electrode 5 is determined under the control of the controller 20.

The wire electrode 5 is fed out from the wire bobbin 6, and collected into the wire collection box 14 via the brake roller 8 driven by the motor/powder brake 7, the pinch roller 9, the upper guide 10, the lower guide 11, the pinch roller 12, and the feed roller 13.

The wire electrode 5 is supported by the upper guide 10 and the lower guide 11 inside the work-pan 3, and stretched in a straight form between the upper guide 10 and the lower guide 11. The wire electrode 5 stretched in a straight form in a state of being soaked in the dielectric working fluid performs electrical discharge machining on the workpiece W.

The wire bobbin 6 receives, from a torque motor (not shown), a prescribed torque in an inverse direction of the feeding direction of the wire electrode 5. Positions of the upper guide 10 and the lower guide 11 may be fixed or changeable by the program corresponding to the shape of the workpiece W, the fixing method, and the machining shape of the workpiece W. The machining power supply 16 enables electrical discharge machining to be performed on the workpiece W by applying a high frequency voltage to the wire electrode 5. However, when a failure occurs with machining performed along concentric machining path, a machining path creation unit 23 performs control to select a concentric machining path the shapes of the corner parts of which are concentric (non-identical radii). The controller 20 may be provided to the wire electrical discharge machining apparatus 1 or the control unit 15, or may be provided to a computer different from those.

As illustrated in FIG. 1, the wire electrical discharge machining apparatus 1 has a Z-axis that moves in parallel to the wire electrode, an XX-axis that moves in a plane perpendicular to the wire electrode, and a UV-axis that moves in parallel to the XY-axis and that is for inclining the wire electrode, and includes the workpiece table where workpiece to be machined is placed. Each of the axes is configured to move by being driven by a servo motor or the like.

In the present embodiment, a command for moving each of the axes is given by the controller 20. Furthermore, recording of the voltage during electrical discharge and discharge delay, time as well as determination of the type of discharge pulse are performed by an arithmetic unit included in the controller 20 or an external arithmetic unit connected to the controller 20.

Figure 2:
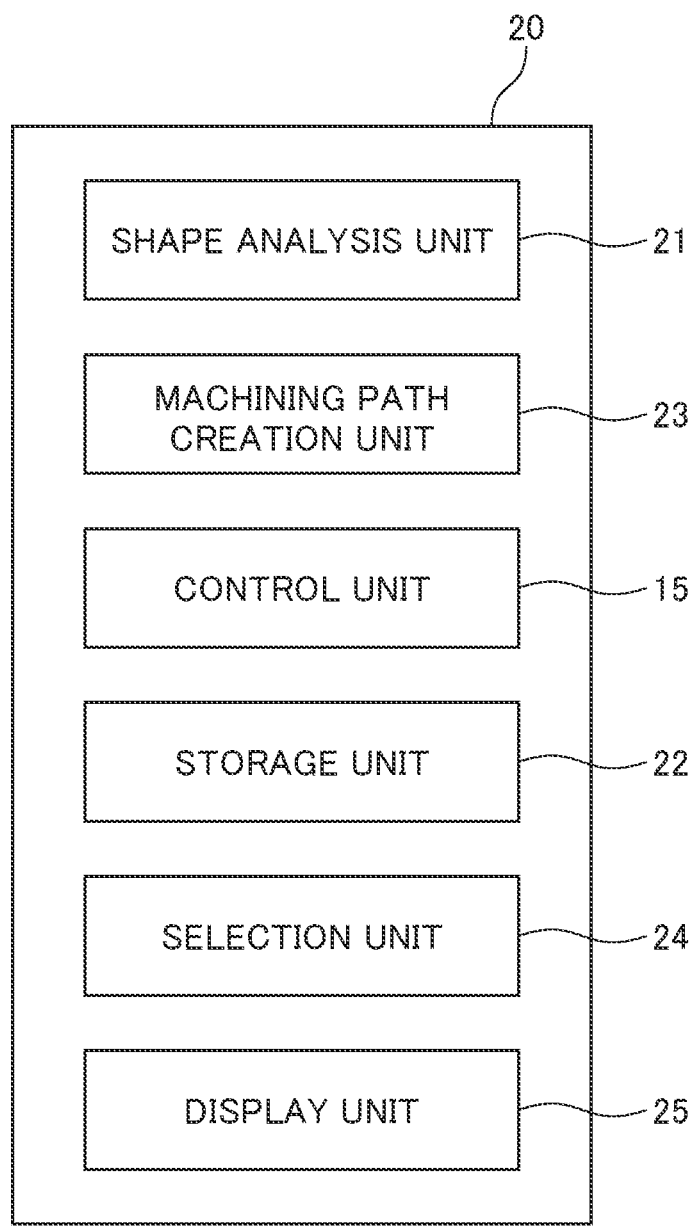
FIG. 2 is a block diagram for describing a controller for controlling a wire electrical discharge machining apparatus according to a first embodiment.

FIG. 2 is a block diagram for describing the controller for controlling the wire electrical discharge machining apparatus according to the first embodiment. This example corresponds to the functional configuration of the controller 20 illustrated in FIG. 1. The controller 20 for controlling the wire electrical discharge machining apparatus, illustrated in FIG. 2 includes: a shape analysis unit 21 as a calculation unit, the storage unit 22, the machining path creation unit 23, a selection unit 24, a display unit 25, and the control unit 15.

The shape analysis unit 21 prefetches the machining program, and analyzes the program shape (machining shape) of the workpiece. The storage unit 22 stores various offset values (machining parameters) and the like to be used in machining steps from roughing to finishing. The storage unit 22 stores a plurality of corner control patterns for allowing switching between prescribed machining conditions defined based on the corner shapes when the wire electrode 5 performs machining on the corner parts of the workpiece W as will be described later.

The storage unit 22 according to the present embodiment stores, in the order of priority, a plurality of corner control patterns SP1 to SPN adaptable to one corner control selected for the processing to be described later. Note here that the corner control patterns SP1 to SPN are a plurality of corner control patterns adaptable to one corner control, when performing electrical discharge machining on continuous overlapping corner control segments. Furthermore, the plurality of corner control patterns stored in the storage unit 22 are several types of patterns obtained by narrowing down and evaluating experimental values and the like. Note that the storage unit 22 is a rewritable memory such as an EEPROM, for example.

When the shape analysis unit 21 determines that machining paths overlap in continuous corner control segments to be described later, the selection unit. 24 selects, from a plurality of corner control patterns SP1 to SPN stored in the storage unit 22, one corner control pattern of high priority for the one of the analyzed continuous corner control segments.

In the present embodiment, for example, in a case where the corner control pattern SP1 (middle of arc>after arc>before arc) and the corner control pattern SP2 (after arc>middle of arc>before arc), which are adaptable to corner control, are selectable for a corner overlapping control segment, the selection unit 24 illustrated in FIG. 2 applies the corner control pattern SP2 that is higher in priority with respect to a shape signal analyzed by the shape analysis unit 21. Note that detailed procedures will be described by referring to a flowchart illustrated in FIG. 3.

The machining path creation unit 23 creates the corner control that is offset, by the offset value stored in the storage unit 22, from the machining program shape analyzed by the shape analysis unit 21. Specifically, the machining path creation unit 23 normally creates the corner control so as to select a concentric machining path with which the shapes of the corner parts are concentric arcs (same radii).

In FIG. 2, the shape analysis unit 21 and the machining path creation unit 23 may be combined into one corner control unit.

When a corner machining path CP1-CP2-CP3 is extracted from the program shape analyzed by the shape analysis unit 21, the machining path creation unit (corner control unit) 23 performs control such that the shapes of the corner parts come to be in concentric arcs, that is, in same radius shapes. Furthermore, the machining path creation unit 23 can also create the corner control offset by the offset value stored in the storage unit 22.

[Selection Processing of Corner Control Pattern]

Hereinafter, described is an example of processing performed by the selection unit 24 for selecting one of the corner control patterns stored in the storage unit 22, when the shape analysis unit 21 detects corner control that overlaps for the corner control segments. Note that the rewritable storage unit 22 stores the program for analyzing the machining program, determination conditions the program refers to, and parameters (including offset values).

Figure 4:
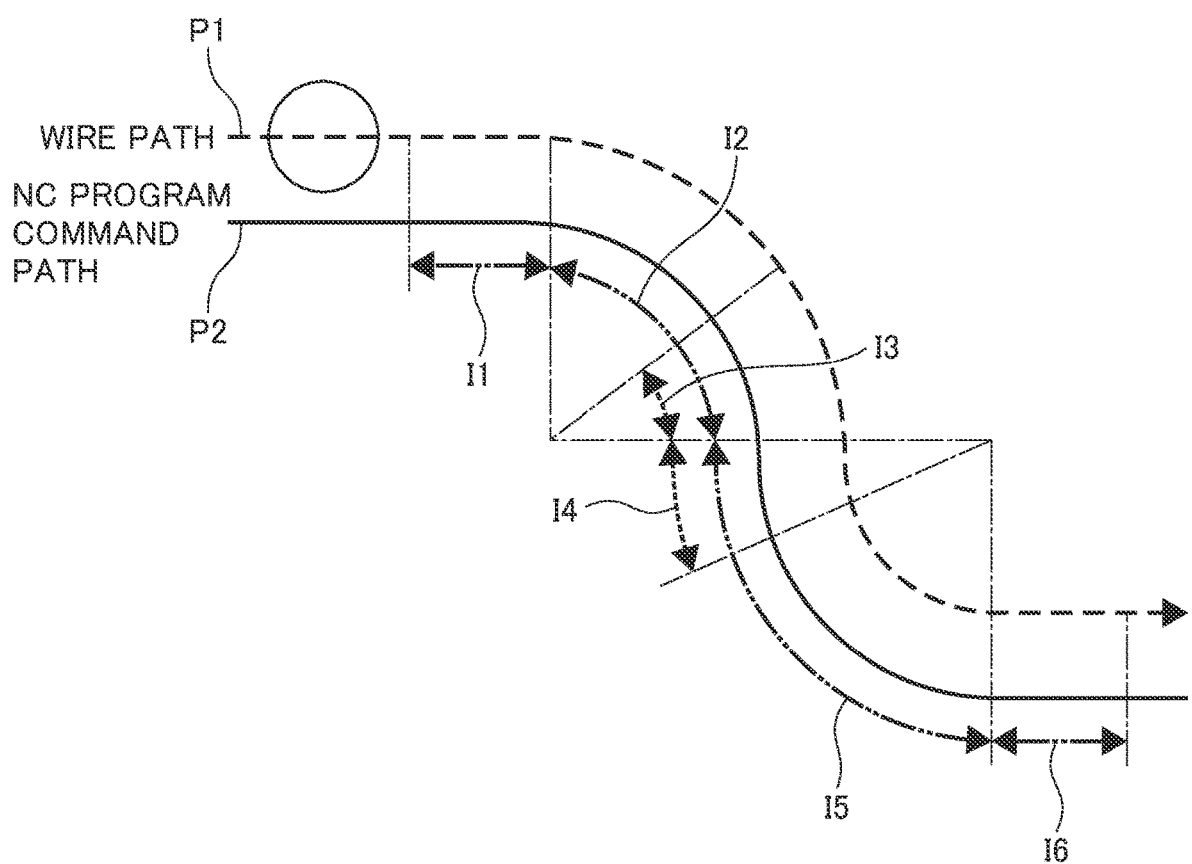
FIG. 4 is a diagram illustrating an example of shape pattern of a plurality of continuous corner control segments.
Figure 5:
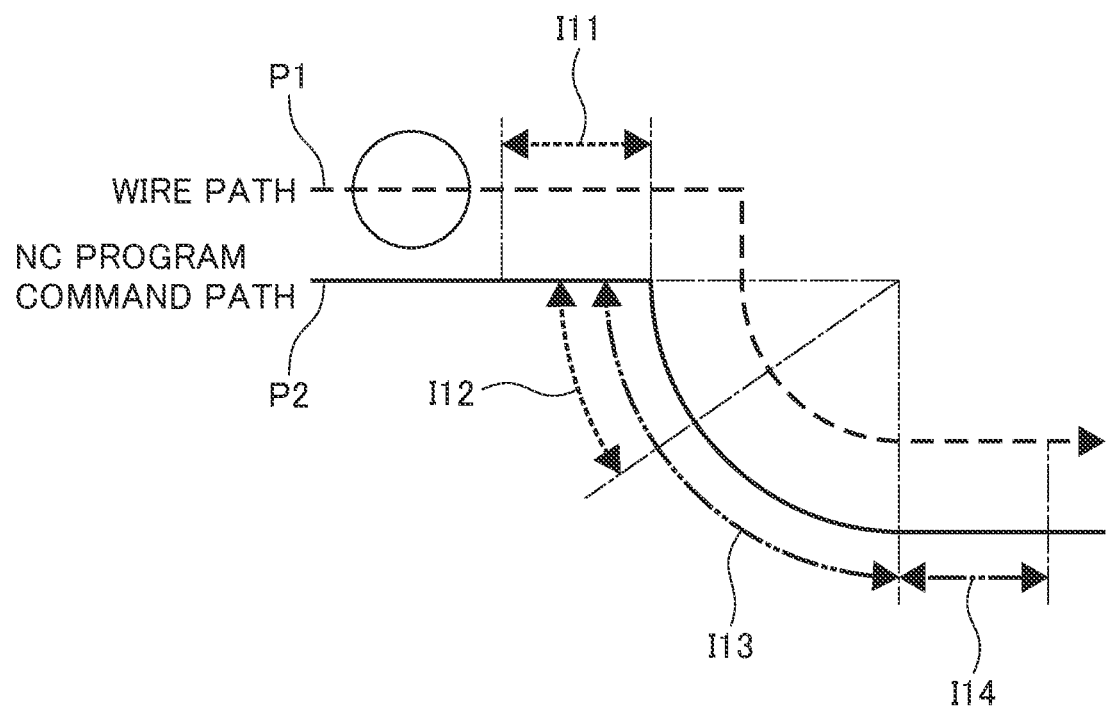
FIG. 5 is a diagram illustrating an example of shape pattern of a plurality of continuous corner control segments.
Figure 6:
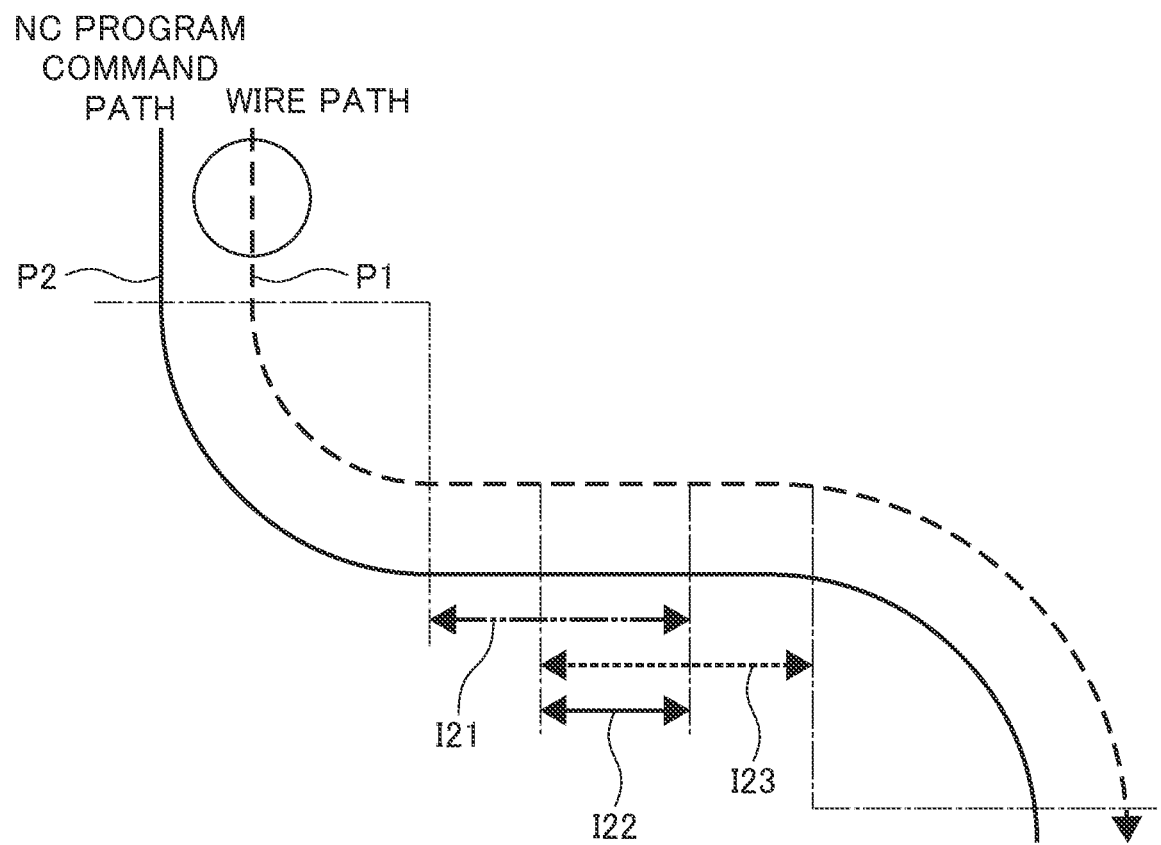
FIG. 6 is a diagram illustrating an example of shape pattern of a plurality of continuous corner control segments.

First, the shape analysis unit 21 as the calculation unit calculates the start point and the end point of the corner control from the corner shape that is generated by way of analysis of the machining program, and determines whether there is an overlapping state occurring in the corner control segments, examples of which are illustrated in FIGS. 4 to 6 to be described later.

When determining that there is an overlapping state in the corner control segments from the shape signal analyzed by the shape analysis unit 21, the selection unit 24 selects one corner control pattern from a plurality of corner control patterns SP1 to SPN stored in the storage unit 22 for adapting to the corner control. Then, the selection unit 24 outputs a final shape signal corresponding to the selected one corner control pattern to the control unit 15.

Figure 3:
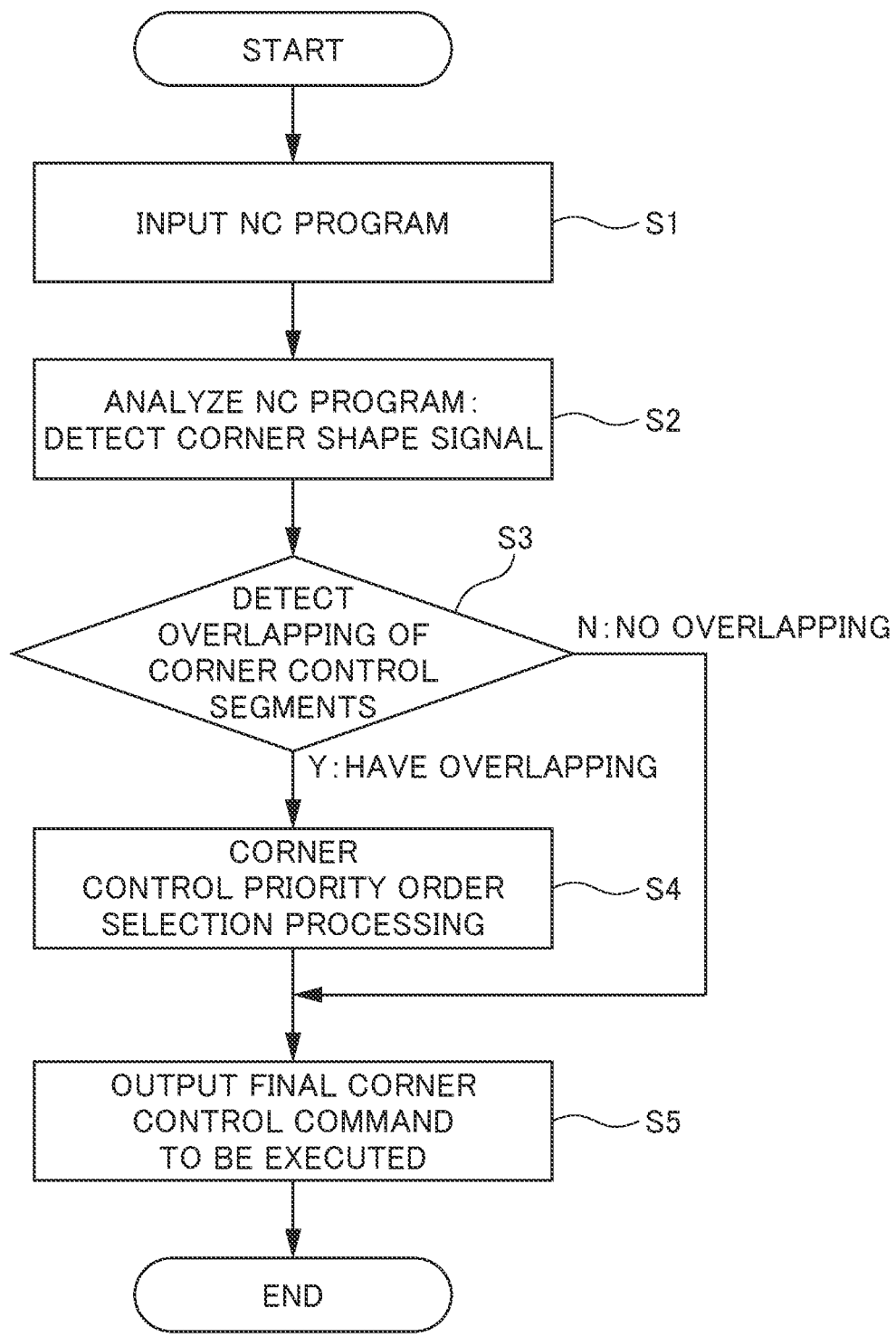
FIG. 3 is a flowchart illustrating a control procedure performed by the controller for controlling the wire electrical discharge machining apparatus.

FIG. 3 is a flowchart illustrating a control procedure performed by the controller for controlling the wire electrical discharge machining apparatus according to the embodiment. Note that S1 to S5 indicate the respective steps, and the control programs corresponding to the steps are stored in the storage unit 22 and executed by the control unit 15 of the controller 20 that predominantly performs the CNC control.

When the CNC program is input in response to an instruction from an operation unit or the like of the wire electrical discharge machining apparatus 1 to start the machining processing (S1), the shape analysis unit 21 starts analysis of the CNC program, and detects a corner shape signal (for example, consisted by a 16-bit signal) (S2).

Note that the number of bits or the like of the shape signal is not limited to 16 bits. Furthermore, the instruction to start the machining processing may be provided from a graphical user interface (GUI) displayed in the display unit 25.

Next, the shape analysis unit 21 determines whether it is detected that the corner shape overlaps in the corner control segments based on the state of the continuous shape signals detected in 32. When the shape analysis unit 21 determines that no overlapping state is detected in the corner control segments from the shape signals, the process proceeds to S5 where a shape signal for executing optimal continuous corner machining is output to the control unit 15, and the processing is ended.

On the other hand, when the shape analysis unit 21 determines in S3 that an overlapping state is detected in the corner control segments from the shape signals, the selection unit 24 selects one high-priority corner control pattern from the corner control patterns stored in the storage unit 22 (S4), and the process proceeds to S5, In S5, a shape signal corresponding to the corner control pattern selected by the selection unit 24 is output to the control unit 15, and the processing is ended.

Note that the change is the machining condition of the continuous corner parts also occurs in the blocks before and after the corner parts. Therefore, not only the corner block but also the blocks before and after that block may be included in the control segments.

FIGS. 4 to 6 are diagrams each illustrating an example of a shape pattern of a plurality of continuous corner control segments to be analyzed by the shape analysis unit 21. Hereinafter, the examples of the shape patterns of the plurality of continuous corner control segments will be described.

In FIGS. 4 to 6, a path P2 indicated by a thick solid line denotes a CNC program command path, and a path P1 indicated by a thick broken line denotes a path of the wire electrode 5. The continuous corner path pattern illustrated in FIG. 4 is a continuous corner pattern example in which an outer arc pre-corner control segment I1—an outer arc in-corner control segment I2—an inner arc in-corner control segment I5—an inner arc post-corner control segment I6 are set.

As for the continuous corner path pattern, in the outer arc in-corner control segment I2, an outer arc in-corner and inner arc pre-corner control overlapping segment 13 is set. Similarly, in the inner arc in-corner control segment I5, an inner arc in-corner and outer arc post-corner control overlapping segment I4 is set. Moreover, it is a corner pattern in which the path is set such that the inner arc in-corner and outer arc post-corner control overlapping segment 14 continuous with the outer arc in-corner and inner arc pre-corner control overlapping segment I3.

The continuous corner path pattern illustrated in FIG. 5 is a continuous corner path pattern example in which an inner arc pre-corner control segment I11—an inner arc in-corner control segment I13—an inner arc post-corner control segment I14 are set.

The continuous corner pattern is a continuous corner path pattern example in which an outer sharp edge pre-corner and inner arc pre-corner control overlapping segment (linear path segment) I11 and an outer sharp edge post-corner and inner arc in-corner control overlapping segment (arc path segment) I12 are set.

The continuous corner path pattern illustrated in FIG. 6 is a continuous corner path pattern example in which an inner arc post-corner control segment I21 and an outer arc pre-corner control overlapping segment I22 are set.

The continuous corner pattern is a continuous corner path pattern example in which, in the inner arc post-corner control segment I21 and the outer arc pre-corner control segment I23, an inner arc post-corner and outer arc pre-corner control overlapping segment I22 is set.

In the present embodiment, in the case of the continuous arc blocks as in FIG. 4, the shape analysis unit 21 can detect the overlapping state or the corner control segments from the corner shape signal to be processed, according to the control procedure illustrated in FIG. 3.

Similarly, even in a case where the start point or the end point of the arc block is a sharp edge corner as in FIG. 5, the shape analysis unit 21 can also detect the overlapping state of the corner control segments from the corner shape signal to be processed.

Similarly, even in a case where the length of a linear block between a corner and a corner is smaller than the total control distance of the corner parts before and after as in FIG. 6, the shape analysis unit 21 can also detect the overlapping state of the corner control segments from the corner shape signal to be processed. Accordingly, the selection unit 24 selects, from the storage unit 22, the corner control pattern optimal for each of the corner control segments detected in FIGS. 4 to 6, and outputs it to the control unit 15.

Effect of First Embodiment

According to the present embodiment, even when machining is performed on a plurality of corner control segments overlapping with each other, a high priority corner control pattern can be selected, whereby machining accuracy based on the corner control can be improved.

Second Embodiment

In the first embodiment, as the selection method of the corner control pattern by the selection unit 24, described is the case of selecting one corner control pattern of high priority from the corner control patterns in which the control segments overlap.

In the second embodiment, as another selection method of the preferential corner control pattern performed by the selection unit 24, described is a case where a user gives an instruction via a screen to select a corner control pattern on which control is to be preferentially performed when an overlapping section of the corner control segments is drawn on the screen of the display unit 25. Note that the display unit 25 may be a touch panel, for example. Furthermore, the user may operate an operation unit such as a keyboard and make selection while viewing the display screen of the display unit 25.

When the user selects, via the screen of the display unit 25, the corner control pattern on which the control is to be preferentially performed, the corner control pattern selected by the user is output to the control unit 15.

In this way, by analysis of the corner parts performed by the shape analysis unit 21, a plurality of corner control pattern candidates applicable to overlapping corner control can be displayed on the display unit 25. The configuration in which the user selects one intended corner control pattern from the displayed plurality of corner control pattern candidates makes it possible to reflect the user's intended corner control to actual machining of the corner parts.

Effect of Second Embodiment

According to the present embodiment, even when machining is performed on a plurality of corner control segments overlapping with each other, the corner control can be executed according to the optimal corner control pattern selected by the user.

Third Embodiment

Note that there are a great number of patterns having overlapping corner shapes as illustrated in the first embodiment, and combinations thereof including factors like corner radius and angle are innumerable. Therefore, the optimal corner control is not always applied to all combination patterns in a case where the corner control is performed by using values interpolated by a same method or in a case where the preferential corner control is determined based on a specific determination criterion. Furthermore, in order to determine the priority order of the corner control patterns with fine machining accuracy, it is necessary to perform brute-force machining experiments on different corner control patterns.

However, with such a method, it requires a great number of steps for determining the corner control pattern and takes time to develop. Thus, in the present embodiment, machine learning using a learning unit 26 illustrated in FIG. 2 is executed. More specifically, in the embodiment, executed is the so-called supervised machine learning that uses, as the input data, corner parts having overlapping corner control segments (which may include corner shapes (radius, angle), material of workpiece, thickness, wire diameter, and the like), and that has, as labels, the corner control patterns selected by the user for each of the corner parts.

FIG. 7 is a block diagram for describing a controller for controlling a wire electrical discharge machining apparatus according to a third embodiment. The controller 20 illustrated in FIG. 7 includes the learning unit 26 in addition to the components illustrated in FIG. 2. In FIG. 7, the learning unit 26 collects priority order select on results of each of the continuous corner control patterns determined by the user, and stores the results in the storage unit 22. Note here that the processing for selecting the priority order may be collection based on the selection made by input via a panel displayed on the display unit 25 or may be collection made by input from other operation units.

Thereby, in the present embodiment, when machining is performed on the corner part including continuous patterns that have not been selected before, the learning unit 26 outputs a corner control pattern of continuous corner parts having a similar characteristic, and the selection unit 24 makes selection of the corner control pattern output by the learning unit 26.

Effect of Third Embodiment

According to the third embodiment, since the selection information of the corner control patterns determined by the user and learned by the learning unit 26 is collected in the storage unit 22, even a corner part including continuous patterns that have not been selected before can be subjected to appropriate corner control, which is automatically selected.

Fourth Embodiment

In the first embodiment, described is a case where the corner control pattern selected by the selection unit 24 is applied to all of the analyzed shape signals.

However, in the first to third embodiments, the corner control pattern selected by the selection unit 24 may not be applied to all of the detected shape signals but the shape analysis unit 21 may preferentially perform sharp corner control when detecting that there is a sharp corner shape signal in the machining segment designated by the user.

Effect of Fourth Embodiment

According to the present embodiment, it is possible to achieve the corner control according to which the corner control pattern selected by the selection unit 24 is applied to only the segment designated by the user from among the corner parts analyzed by the shape analysis unit 21.

Fifth Embodiment

According to the first to fourth embodiments, in a case where shape signals of a plurality of continuous corners are output, the shape analysis unit 21 may omit signals other than the shape to which the control preferentially performed (may change corresponding value from "1" to "0") and output only the shape signal to perform the control. Thereby, the selection unit 24 can also output, to the control unit 15, only the shape signal that has been acquired by applying compensation processing on the shape signal output from the shape analysis unit 21.

Furthermore, depending on the shapes of continuous corner parts detected by the shape analysis unit 21, the selection unit 24 may output a plurality of shape signals and perform corner control simultaneously. Furthermore, the selection unit 24 may omit all shape signals associated with all corners detected by the shape analysis unit 21 (may change all the corresponding values from "1" to "0") and perform no corner control.

Effect of Fifth Embodiment

According to the present embodiment, it is possible to achieve the corner control that conforms to the intention of the user, by combining the corner control using the corner control pattern and the corner control intended by the user.

Note that the present disclosure is not limited to the embodiments described above, but includes modifications and improvements within the range is which the object of the present disclosure can be achieved.

EXPLANATION OF REFERENCE NUMERALS

1: Wire electrical discharge machining apparatus
15: Control unit
20: Controller
22: Storage unit
23: Machining path creation unit
24: Selection unit
25: Display unit
26: Learning unit

The invention claimed is:

1. A controller for controlling a wire electrical discharge machining apparatus including a machining unit that performs discharge machining on a workpiece by executing a machining program, the controller comprising:
    a storage unit that stores the machining program and a plurality of corner control patterns each of which is applicable to a respective one of corner parts;
    a control unit that performs corner control for switching to a prescribed machining condition based on a corner shape when machining is to be performed on the corner part;
    a calculation unit that calculates corner control segments from a start point and an end point of the corner control;
    a selection unit that selects, from the storage unit, one of the corner control patterns to be performed in a case where the corner control segments calculated by the calculation unit overlap; and
    a display unit that displays a drawing result of the machining program and the corner part where the corner control segments calculated by the calculation unit overlap,
    wherein in a case where a user selects one of the corner control patterns from the storage unit based on display of the display unit, the selection unit selects the corner control pattern selected by the user.

2. The controller for controlling the wire electrical discharge machining apparatus according to claim 1, further comprising a learning unit that learns the corner control pattern selected by the user, for each of the corner parts where the corner control segments overlap.

* * * * *